United States Patent
Ottaviani et al.

(10) Patent No.: US 7,640,346 B2
(45) Date of Patent: Dec. 29, 2009

(54) DISPATCHING NETWORK CONNECTIONS IN USER-MODE

(75) Inventors: Mauro Ottaviani, Mercer Island, WA (US); Alfred McClung Lee, IV, Seattle, WA (US); Elliot L. Waingold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 11/049,051

(22) Filed: Feb. 1, 2005

(65) Prior Publication Data

US 2006/0173854 A1 Aug. 3, 2006

(51) Int. Cl.
*G06F 15/16* (2006.01)
(52) U.S. Cl. .................................. 709/227
(58) Field of Classification Search ................ 709/227
See application file for complete search history.

(56) References Cited

U.S. PATENT DOCUMENTS

| | | | |
|---|---|---|---|
| 5,721,876 A | 2/1998 | Yu et al. | 395/500 |
| 5,784,615 A * | 7/1998 | Lipe et al. | 719/324 |
| 6,182,141 B1 * | 1/2001 | Blum et al. | 709/227 |
| 6,243,753 B1 * | 6/2001 | Machin et al. | 709/227 |
| 6,658,469 B1 * | 12/2003 | Massa et al. | 709/224 |
| 6,708,223 B1 * | 3/2004 | Wang et al. | 719/315 |
| 6,754,709 B1 * | 6/2004 | Gbadegesin | 709/227 |
| 6,779,035 B1 * | 8/2004 | Gbadegesin | 709/228 |
| 6,789,204 B2 * | 9/2004 | Abdelnur et al. | 726/1 |
| 6,954,797 B1 * | 10/2005 | Takeda et al. | 709/236 |
| 7,334,163 B1 * | 2/2008 | Sallam, Ahmed | 714/38 |
| 2002/0059425 A1 * | 5/2002 | Belfiore et al. | 709/226 |
| 2002/0091863 A1 * | 7/2002 | Schug | 709/250 |
| 2002/0124089 A1 * | 9/2002 | Aiken et al. | 709/227 |
| 2003/0182397 A1 * | 9/2003 | Mitra et al. | 709/218 |
| 2003/0182400 A1 * | 9/2003 | Karagounis et al. | 709/219 |
| 2004/0003085 A1 * | 1/2004 | Joseph et al. | 709/226 |
| 2004/0044760 A1 | 3/2004 | Deily et al. | 709/223 |
| 2004/0103221 A1 * | 5/2004 | Rosu et al. | 710/1 |
| 2004/0122953 A1 * | 6/2004 | Kalmuk et al. | 709/227 |
| 2004/0167961 A1 * | 8/2004 | Jain et al. | 709/203 |
| 2004/0192312 A1 * | 9/2004 | Li et al. | 455/445 |
| 2004/0236745 A1 * | 11/2004 | Keohane et al. | 707/9 |

(Continued)

OTHER PUBLICATIONS

Hunt, Galen C. "Creating User-Mode Device Drivers with a Proxy," *Proceedings of the 1st USENIX Windows NT Workshop*, Seattle, Washington, Aug. 1999, pp. 1-6.

*Primary Examiner*—Imad Hussain
(74) *Attorney, Agent, or Firm*—Workman Nydegger (57) ABSTRACT

A listener operating in user-mode can dispatch control of a client connection to a listener without exposing system memory or other sensitive services or components. For example, a client component requests access to a network component through connection with a user-mode listener. Based on information contained in the client request, the listener passes a call to an application program interface, which returns a first set of data that includes user-mode contextual information. The listener passes this first set of data to the requested network component. Another call is made to an application program interface, which includes the first set of data, and a request for socket duplication. The application program interface returns control of the requested socket to the network component, such that the network component and the client component communicate directly through the requested socket in user-mode.

20 Claims, 3 Drawing Sheets

U.S. PATENT DOCUMENTS

| | | | |
|---|---|---|---|
| 2004/0243853 A1 | 12/2004 | Swander et al. | 713/201 |
| 2004/0249957 A1* | 12/2004 | Ekis et al. | 709/228 |
| 2005/0005165 A1* | 1/2005 | Morgan et al. | 713/201 |
| 2005/0021680 A1* | 1/2005 | Ekis et al. | 709/219 |
| 2005/0165932 A1* | 7/2005 | Banerjee et al. | 709/226 |
| 2006/0020688 A1* | 1/2006 | Chang et al. | 709/219 |
| 2006/0075119 A1* | 4/2006 | Hussain et al. | 709/227 |
| 2006/0165074 A1* | 7/2006 | Modi et al. | 370/389 |
| 2006/0168213 A1* | 7/2006 | Richardson et al. | 709/225 |
| 2007/0168576 A1* | 7/2007 | Rosenbloom et al. | 710/15 |
| 2008/0240130 A1* | 10/2008 | Oved | 370/401 |
| 2008/0240154 A1* | 10/2008 | Oved | 370/466 |

* cited by examiner

DISPATCHING NETWORK CONNECTIONS IN USER-MODE

BACKGROUND OF THE INVENTION

1. The Field of the Invention

This invention relates to systems, methods, and computer program products for providing network listeners the ability to hand off control of network connections to a requested process in user-mode.

2. Background and Relevant Art

As an increasing number of people and institutions are implementing computerized systems, whether in a work, home, or in an entertainment environment, the needs for sharing computing resources has also increased. One type of sharing environment is a distributed file system, which is generally a client/server-based application that allows clients to access and process data stored on a central server over a network, as if the server were the client's own computer. For example, several workers of a company may be allowed to electronically access certain files at a remotely located network drive from multiple personal computers. In another example, a computing system at one location might need to use the processing resources of another computer at another location to aid with a specific job.

Of course, just as sharing various files and processes over a network can provide a number of obvious advantages, the problems and disadvantages of networking are also well known. These problems range from benign architectural problems to those of intended malice. An example of a benign architectural problem is the fact that network computers have a limited number of ports, which in turn are usually only allowed to provide client components with access to a limited number of network components, such as network processes, modules, and the like. This can create a problem when a large number of client components need access to several network components through the same port.

On the other hand, well-known examples of malicious network problems include computer viruses, and network intruders. Viruses are computer-executable instructions typically passed electronically from one unwitting recipient to the next that, when executed, alter or erase important systems files, steal personal information, or the like. Similarly, network intruders can be a problem with networks that are open to outside connections, such as an otherwise closed work network that has a connection to the Internet. For example, a malicious person might find a way to gain electronic access to a company's network server beyond what was otherwise intended, and gain access to valuable company or employee documents found inside the network.

Accordingly, operating system security for computerized systems is increasingly important for computers on a network. Presently, there are myriad ways and processes computerized systems use to enforce security. These can generally be classified into the type of permissions in which a process or component runs, such as running in a user-mode (more limited, less control) level of control, or running in a kernel-mode (less limited, greater control) level of control. Generally, for example, if a client component and a requested network process at a network computer are communicating information in user-mode, the client component has only limited (if any) access to the network process, and only limited (if any) access to the network computer's system memory or services.

If the client component, however, connects to the network computer component through a kernel-mode driver running on the network computer, the client has much more flexibility. In particular, the client process may, in some cases, have unlimited access to the system memory, and/or to other services, processes or components at the network computer. In particular, a kernel-mode driver listening on a network has little or no control over who will send it messages. If the kernel-mode driver is "duped" by the sender of messages, there is little or no limit to the damage the sender of messages can do. By contrast, processes running in user-mode can be limited by operating system security.

As such, user-mode and kernel-mode levels of running components can provide a number of respective advantages and disadvantages, and so are typically implemented in specific types of situations. For example, a user-mode listener, such as a component implementing HTTP requests over a TCP protocol on a network stack, operates by relaying client process data to a requested network process through any number of communication mechanisms, such as through a shared memory space, a named pipe, Remote Procedure Protocol ("RPC"), Distributed Component Object Model ("DCOM"), or the like. The requested process then takes the relayed client process data through the relevant communication mechanism, and likewise responds to the client process only through the relevant communication mechanism. As such, the client process and the requested network computer process never communicate directly.

In particular, since the listener operating in user-mode has only limited access to system memory, and has only limited access to other system processes or components, a malicious client process is significantly hindered from causing damage to the network computer, or accessing sensitive information. On the other hand, since the user-mode listener acts as an intermediary relay mechanism using a shared memory, named pipe, or the like, the user-mode listener can become a significant bottleneck in network communication speeds, particularly with large numbers of outside client connections, or large data transfers.

By contrast, a kernel-mode listener, such as a network driver operating in kernel-mode, writes the connection data from the client process directly to system memory, and may even dispatch control of the entire connection to the requested network process, if appropriate. In either case, the kernel-mode listener allows the network process to communicate with the client process using mechanisms that are much faster than using a shared memory space, named pipe, or the like, as with a user-mode listener. Unfortunately, because a kernel-mode listener has fairly unfettered access to the network computer system and memory, a malicious person or program could overrun the network computer memory and gain access to sensitive system files or other network processes on the network computer. Thus, a kernel-mode listener is typically avoided in many situations where the speed associated therewith could be helpful.

Accordingly, an advantage in the art can be realized with systems, methods, and computer program products that allow a user-mode listener to facilitate communication between a client process and a requested network process without incurring the typical speed or bottleneck issues associated therewith. Furthermore, an advantage can be realized with such systems that facilitate communication between a client process and a requested network computer when appropriate, without at the same time exposing system memory or other sensitive system processes at the network computer.

BRIEF SUMMARY OF THE INVENTION

The present invention solves one or more of the foregoing problems in the art with systems, methods, and computer program products that allow a user-mode listener to effectively dispatch control of a client connection to a network computer component in a safe manner. In particular, a user-mode listener, in accordance with the present invention, can dispatch control of a client connection to a requested network component without exposing the system memory and/or system services of the network computer.

For example, in at least one implementation of the present invention, a listener, such as a network connection process operating in user-mode at a network computer, receives a request from a client component for communicative access to a network component. If appropriate, the user-mode listener then passes a request for socket duplication to a first application service, such as an application program interface ("API"), or other component, or module, which returns a first set of data that includes user-mode contextual information. The user-mode listener then passes the first set of data sent by the first application service to the requested network component using conventional relay mechanisms, such as a shared memory, named pipe, or the like.

If appropriate, the requested network component then calls an application service, such as the first or a second application service, to duplicate the socket controlled by the user-mode listener, and passes the first set of data as a parameter. The called application service then provides the network component with a response that has parameters of control over a specified socket, and parameters of the first set of data. With control over the specified socket, the requested network component is able to communicate directly with the client computer component through the socket for the remainder of the client connection. Thus, the user-mode listener in accordance with the present invention can dispatch control of the client connection to the network computer component without exposing the system memory or other sensitive system services, components or processes. This allows the client component and the network computer component to communicate in speeds similar to that of operating in kernel-mode with the security typically associated with user-mode.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products that allow a user-mode listener to effectively dispatch control of a client connection to a network computer component in a safe manner. In particular, a user-mode listener, in accordance with the present invention, can dispatch control of a client connection to a requested network component without exposing the system memory and/or system services of the network computer.

Thus, as will be understood from the present specification and claims, one aspect of the invention comprises dispatching control of a connection with a client component (e.g., a process, interface, or module, etc.) to a requested network component (e.g., a process, interface, or module, etc.). Furthermore, although it will be understood that the connection described herein can be between client components at a client computer system and network component at a different network computer system, the principles of the invention described herein can also be applied in the context of inter-component connections at the same local computer. That is, there are situations in which client and network components of the same computer system communicate data to one another through an intermediary process, such as a listener.

In any event, when the client component establishes a connection, the user-mode listener that interfaces with the network stack can implement dispatch logic to ascertain whether to dispatch control of the client connection to the network component. Although not necessarily required, another aspect of the invention can include the requested network component implementing a similar calculus to ascertain whether it should accept control of the client connection from the user-mode listener. When network component control is appropriate in each situation, the network component can accept control of the connection, and speak directly with the client component through the network stack. Accordingly, a client component and network component can communicate at speeds that are similar to those of communicating in kernel-mode, without necessarily risking one or more of the disadvantages thereof.

Figure 1A:
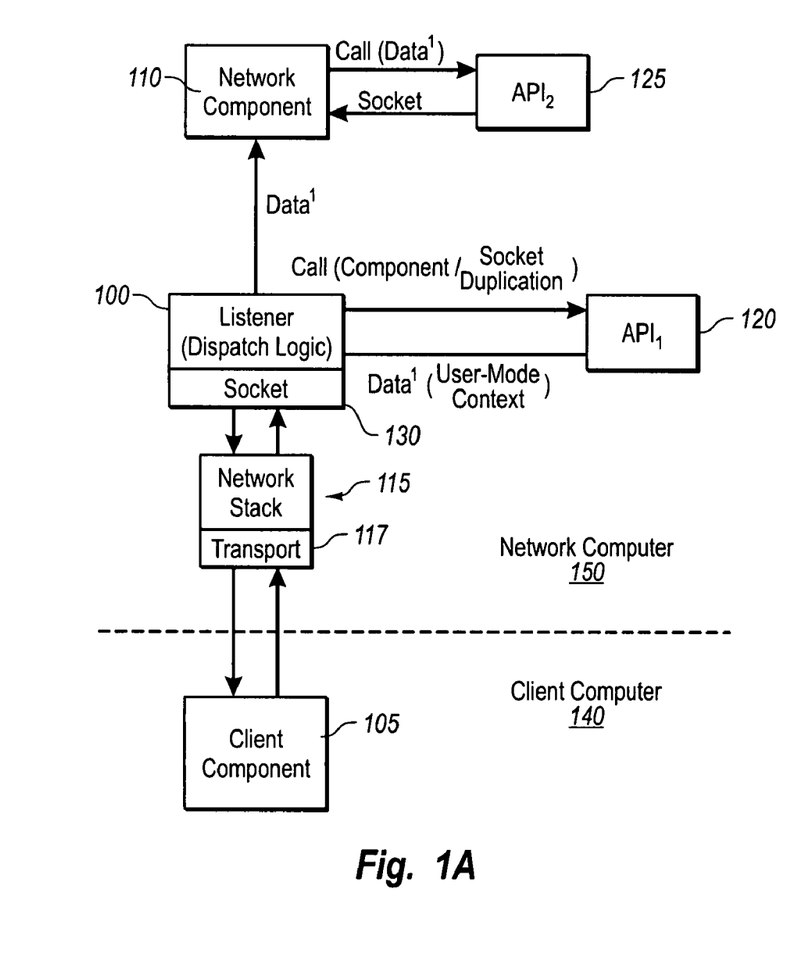
FIG. 1A illustrates a schematic overview in which a listener operating in user-mode begins to hand off a connection between a client component and a network component in accordance with an implementation of the present invention.

For example, FIG. 1A illustrates a schematic overview for practicing the invention between two computers, in which a user-mode listener 100 controls a connection between a client component 105 from a client computer 140 and a network component 110 at the network computer 150. In one implementation, the user-mode listener 100 is a network connection process operating in user-mode, although the user-mode listener 100 will be understood generally as any interface, component, or module that interfaces with a network stack 115, and initially controls a user-mode network connection between a client component and a network component. Thus, FIG. 1A shows that the client component 105 has established a connection with the network computer 150 through the network stack 115. Furthermore, FIG. 1A shows that the listener 100 controls this connection between the client component 105 and the network component 110 through a socket 130.

Initially, when the client component 105 and listener 100 establish the connection, the listener 100 reads at least a portion of one or more of the initial data packets sent in by the client component 105. In one implementation, the user-mode listener 100 does so to identify such factors as the requested network component (e.g., 110), and/or some indication as to the length of the requested connection, when or if appropriate. The listener 100 can also implement "dispatch logic" when reading the initial one or more data packets from the client component 105 to determine, based on one or more of a client message property or a system property, whether an efficiency gain can be made by transferring control of the connection.

For example, a client message property can include whether all or most of the data packets sent by the client component 105 are intended for the same requested network component 110, or whether the length of the connection session or size of the messages to be sent are such that dispatch of control is appropriate, and so forth. By contrast, a system property can include consideration of load balancing or security policy concerns, which could be better implemented by dispatching the connection to the requested network component. Accordingly, the dispatch logic can evaluate a number of client or other system factors to indicate to the listener 100 that it is cost-effective to hand off control of the connection.

If the dispatch logic indicates to the listener 100 that it is cost-effective from a resource standpoint to transfer control of the established client connection, the listener 100 can then initiate transfer of control of the established connection. To do so, the listener 100 sends a function call to an application service 120, such as an application program interface ("API"), or other component or module, that administers socket control. In one implementation, the listener 100 also passes, as parameters of the function call, the network component 110 requested by the client component 105, as well as a request for socket duplication. The application service 120 then responds with a first set of data (i.e., "Data$^1$") that is specific for the established connection between the client component 105 and the network component 110. In one implementation, this first set of data includes such data as one or more state variables of the network stack 115 for the established connection, as well as user-mode context information for the connection, and any data sent by the client component 105 when establishing the connection.

Upon receiving the first set of data (i.e., "Data$^1$"), FIG. 1A shows that the listener 100 forwards the first set of data and contextual information to the requested network component 110 using the communication mechanism for the user-mode connection. For example, the existing connection path may involve use of a shared memory space, a named pipe, RPC, DCOM, or the like. With respect to a shared memory space, this typically involves the listener 100 placing the first set of data and contextual information into a previously allocated shared memory. In such a situation, the listener 100 may also send a separate signal (not shown) to the network component 110 that indicates that there is a first set of data in the shared memory for the network component 110 to extract.

Once the network component 110 receives the first set of data and contextual information, the network component 110 can initiate steps to accept control of the connection. In one implementation, this involves the network component 110 also performing an additional evaluation similar to the "dispatch logic" used by the listener 100. For example, the network component 110 may try to identify whether the client component 105 is a trusted client, or whether the type of data the client component 105 intends to pass is appropriate to be passed to the network component 110 directly. In any event, if the network component 110 decides to accept control of the connection, the network component 110 initiates steps to duplicate the socket 130. To do so, the network component 100 passes a function call to an application service, with parameters of the first data set, as well as a request to duplicate the socket 130 controlled by the listener 100.

As shown in FIG. 1A, the network component requests duplication of the socket 130 by calling application service 125, which is a different, second application service, component or module distinct from application service 120. One will appreciate, however, that using the same application service may be appropriate in some circumstances, while using two different application services by the network component 110 and listener 100 may be appropriate in other circumstances. In any event, FIG. 1A those that application service 125 evaluates the function call and the included data passed from the network component 110. The application service 125 then returns data to the network component 110 that allows the network component 110 to control the socket 130. For example, the application service may return the name or address of the socket 130, an initial packet or so of data received from the client component before the connection is dispatched, as well as any other network stack state variables that should be relayed back to the listener 100 and to the network stack 115. The application service 125 may also return user-mode context information, as appropriate.

The network process 110 then uses the returned data from the application service 125 to take control of the socket 130, and therefore control of the established connection. In at least one implementation, this step for taking control of the connection can involve additional acts performed by the network process 110 and listener 100. For example, in one implementation, the network process 110 sends an indicator to the listener 100 that the network process 110 has taken control of the socket 130. In response to this indicator, the listener 100 sends another indicator to, for example, the transport layer 117 of the network stack, indicating that the listener 100 is unable to receive any more client process 105 data. In another implementation, the listener 100 also sends a signal to the network stack 115, which tells the relevant layers to buffer incoming client process 105 data momentarily until the network process 110 has established control of the socket 130 in some way.

Figure 1B:
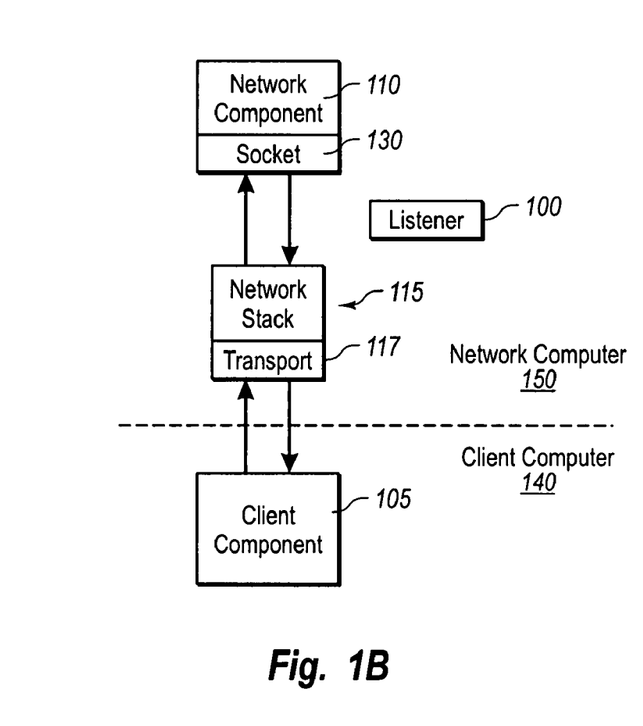
FIG. 1B illustrates the schematic overview of FIG. 1A, in which the network component has control of the connection.

Once all relevant components understand that the requested network component 110 has accepted control of the established socket 130, the network component 110 will be understood as having accepted control of the established connection. In particular, FIG. 1B shows the schematic diagram of FIG. 1A in which the network component 110 has gained control of the socket 130. In this Figure, the listener 100 no longer acts as a relay intermediary between the client component 105 and the network component 110, such that the network component 110 and client component 105 communicate directly through the network stack 115.

As previously described, this direct communication is typically much faster than having to communicate with the aid of the listener 100 in user-mode through a shared memory, named pipe, or the like. Furthermore, one or more additional advantages, such as may relate to security issues, can be realized since the switch of socket 130 control can be made transparent to the client component 105, such that the client component 105 is unaware that there has been a switch in control of the socket from the listener 100 to the requested network component 110. That is, the client component 105 may not have been aware initially that its connection was being handled by the listener 100 at all. Even if the client component 105 was aware it was speaking to the listener 100, implementations of the present invention would not require a signal to be sent to the client component 105 that the network component 110 is now in control of the socket 130.

Figure 2:
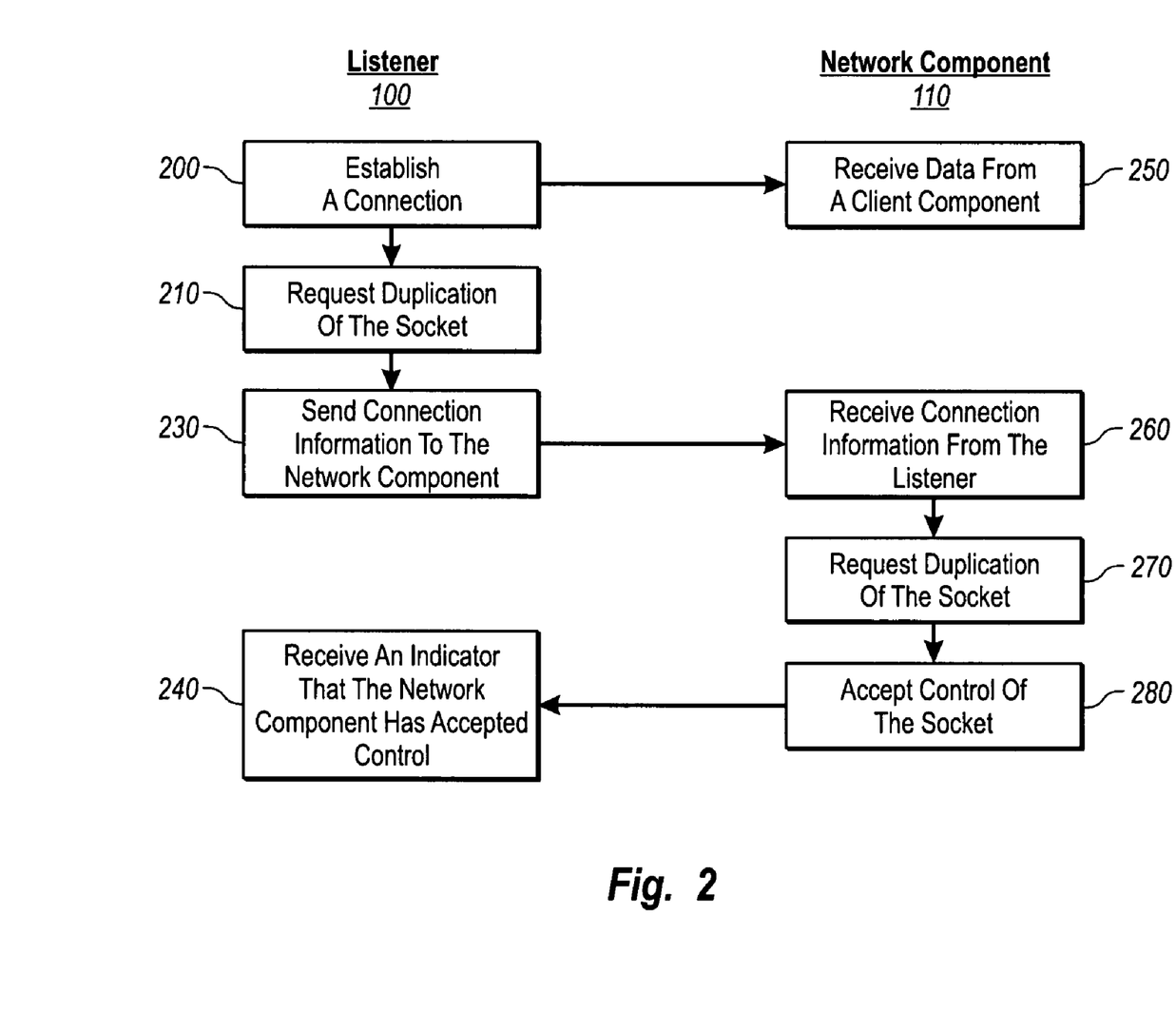
FIG. 2 illustrates a flow chart of acts for passing off a connection by the listener, and for receiving control of a connection by the network component from the listener in accordance with an implementation of the present invention.

The present invention can also be described in terms of specific, non-functional acts for accomplishing functional results, as part of one or more methods in accordance with implementations of the present invention. In particular, FIG. 2 illustrates two methods in an interrelated flow chart, where one side illustrates acts performed from the perspective of the user-mode listener 100, while another side of the flow chart illustrates acts performed from the perspective of the requested network component 110. The acts of FIG. 2 will be described below in terms of the schematic diagrams shown in FIGS. 1A and 1B.

For example, FIG. 2 shows that a method in accordance with the present invention of dispatching control of a connection to a network component in user-mode from the listener 100 side comprises an act 200 of establishing a connection. Act 200 includes establishing a connection in user-mode between a client component and a listener through a socket in user-mode. For example, a client component 105, such as a process at the same or different remote computer, initiates a connection with listener 100, and requests a specific network component 110, such as another process at the same or different remote network computer, as part of the connection parameters. Since the connection is in user-mode, a listener 100 that interfaces with the network stack 115 will control the connection through a socket, such as through socket 130 shown in FIG. 1A.

In some cases, the listener 100 will also relay an initial part of the connection data to the network component 110 before or while the listener 100 begins to dispatch the connection. Accordingly, a method from the network component 110 side can comprise an act 250 of receiving data from a client component. Act 250 includes receiving an initial set of data from a client component 105 through the user-mode listener 100. For example, the network component 110 may receive one or more data packets through a shared memory, named pipe, RPC, DCOM, or the like as the listener 100 decides what to do with the established connection.

Referring again to the listener 100 perspective, the method of dispatching a connection also comprises an act 210 of requesting duplication of the socket. Act 210 includes requesting duplication of the socket based on information associated with the connection, wherein a first set of data is received. For example, after reading an initial set of data in the connection initiated by the client component 105, the listener 100 can implement dispatch logic. As described herein, the dispatch logic can include functions that evaluate such factors data for the state variables of the network stack 115, the amount of data to be transferred in the established connection, the length of the connection, whether the client is a trusted client, and so forth.

If the dispatch logic analysis suggests handing control to the network component 110, the listener 100 can, in some cases, perform any number of additional steps. For example, the listener 100 can send a function call to an application service 120 as previously described. In one implementation, the parameters of the function call include the network component requested by the client, some initial amount of data sent by the client component 105, a request for socket duplication, and/or any combination of the foregoing. The application service 120 could then return a first set of data (e.g., "Data$^1$") that includes user-mode context information as part of its parameters. As shown in act 230, the listener 100 then passes any relevant data such as this on to the network component 110.

Accordingly, the method of FIG. 2 from the network component 110 perspective comprises an act 260 of receiving connection information from the listener. Act 260 includes receiving connection information from the user-mode listener, wherein the connection information identifies information about the client component and the established connection. For example, the network component 110 can receive a first set of data (i.e., "Data$^1$"), which is relayed through a relay communication mechanism such as a shared memory, named pipe. In some cases, this first set of data may also include other data in the established client connection that has not yet been received from the client component 105, as well as any data that the network component 110 can use to identify whether accepting control of the socket 130 is appropriate. For example, the listener 100 may decide it is appropriate to hand off control of the socket 130 to the network component 110, but the network component 110 may implement its own similar dispatch logic to decide that the network component 110 is not suited to handle control of the connection. For example, the network component 110 may determine that the client component 105 is not trusted. Alternatively, the network component 110 may be configured simply to accept all dispatched connections from the listener 100.

Nevertheless, if the network component 110 has determined that it is able to accept control of the socket 130, FIG. 2 shows that the network component 110 performs an act 270 of requesting duplication of the socket. Act 270 includes requesting duplication of the socket associated with the connection. For example, the network component 110 passes a function call to an application service, whether the same application service 120 as before, or a different application service, such as application service 125. The parameters of the function call include the first set of data (e.g., "Data$^1$") passed previously to the listener 100. The relevant application service, such as application service 125, then processes the function call and returns socket information to the network component 110. The socket information may also include one or more state variables of the network stack 115 that are associated with the established connection. In any event, the returned information allows the network component 110 to take control of the socket 130.

Accordingly, the method from the network component perspective also comprises an act 280 of accepting control of the socket. Act 280 includes accepting control of the socket from the listener, wherein the network component communicates directly with the client component through the connection in user-mode. For example, in one implementation, the network component 110 sends a signal to the listener 100 indicating that the network component 110 has accepted control of the socket (e.g., FIG. 1B). In other implementations, however, the network component 110 may communicate directly with the network stack 115, and tell the network stack 115 to stop sending information through the listener 100.

Nevertheless, the method of FIG. 2 from the listener 100 perspective shows that a method for dispatching control can comprise an act 240 of receiving an indicator that the network component has accepted control. Act 280 includes receiving an indicator that the network component has accepted control of the socket, such that the listener no longer accepts connection data from the client computer for the connection, and such that the network component and the client component communicate through the connection without the listener. For example, since the listener passed control of the socket 130 in user-mode, the network component 110 is also effectively connected to the client component 105 in user-mode. That is, the client component 105 and the network component 110 are directly connected through the network protocol stack 115, albeit in a mode that is limited in terms of memory usage, or other limited permissions, and thus avoids exploitation of the network computer.

Accordingly, implementations of the present invention provide a number of advantages in the art. In particular, relatively secure, or more limited, connections can be made between network and client components between different computers or at the same computer with much faster speeds where necessary, even approaching kernel-mode connection speeds or better. Furthermore, implementations of the present invention allow the listener to pass off connections to network components primarily when those connections might pose a bottleneck to the system. As such, the listener can still continue to handle a large amount of connections in user-mode that do not stand to significantly gain with dispatching the connection, and do dispatches in a much more efficient manner.

Figure 3:
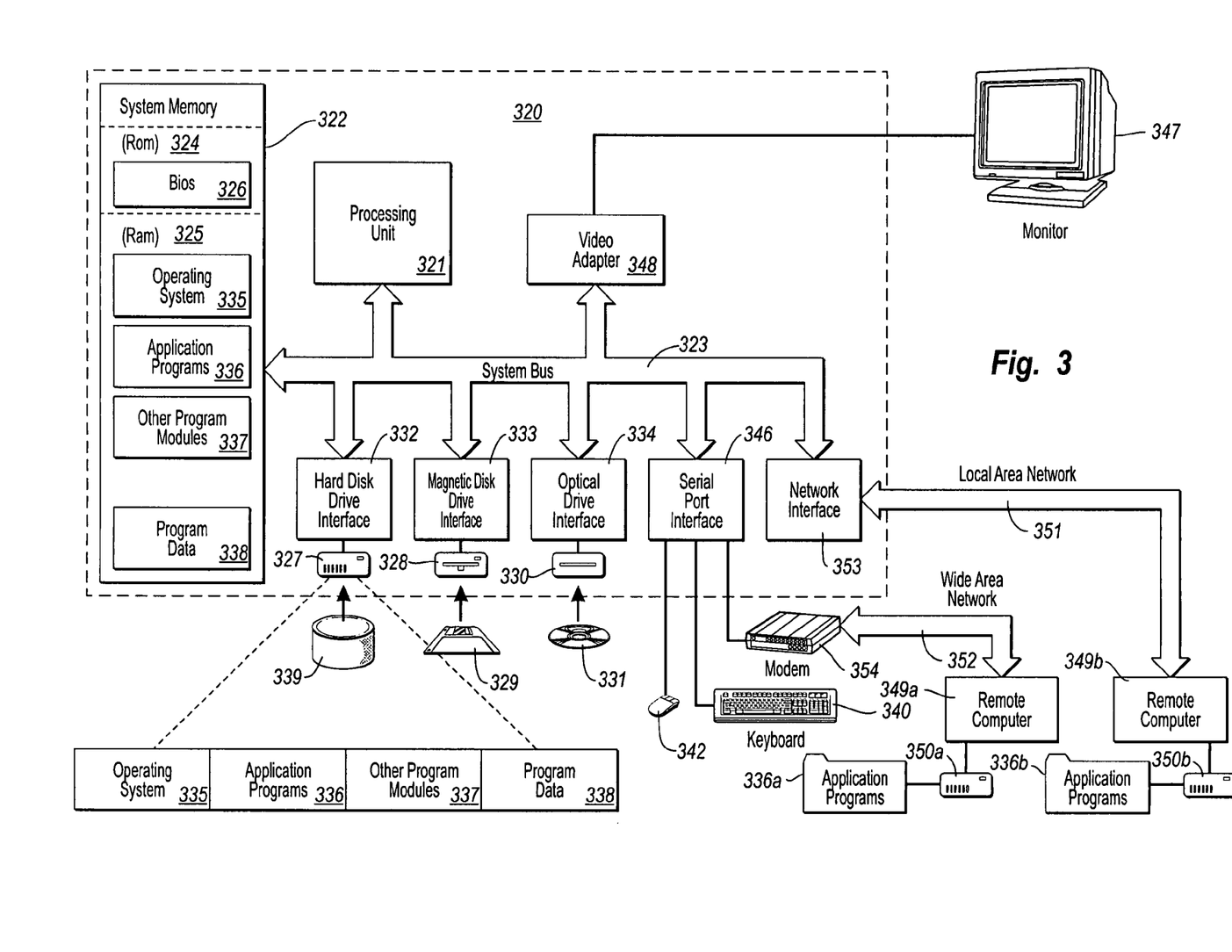
FIG. 3 illustrates a schematic diagram of a suitable computing environment for implementing the systems and methods in accordance with the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disc drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349*a* and 349*b*. Remote computers 349*a* and 349*b* may each be another personal computer, a server, a router, a network PC, a peer device or other common network node, and typically include many or all of the elements described above relative to the computer 320, although only memory storage devices 350*a* and 350*b* and their associated application programs 336*a* and 336*b* have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a user-mode listener of a network computer system, wherein the user-mode listener is configured to relay a connection between a process at a client computer system and a process at the network computer in user-mode, a method of dispatching control of the connection to the network process in user-mode, comprising the acts of:

establishing a connection in user-mode between a client process and a network process through a socket;

sending a function call to a service that administers socket control, the function call including parameters comprising a request for duplication of the socket and identification of a network component;

receiving from the service a first set of data, the first set of data specific to a connection to the network component;

sending, using the user-mode connection, the first set of data to the network process; and receiving an indicator that the network process has accepted control of the socket, such that the listener no longer accepts connection data from the client computer for the connection, and such that the network process and the client process communicate through the connection without the listener, and wherein the network process and the client process communicate directly through a network stack without the use of any of the set of a shared memory, a named pipe, an RPC, and DCOM protocol.

2. The method as recited in claim 1, wherein establishing a connection comprises receiving a request from the client process to access the network process through the listener.

3. The method as recited in claim 1, wherein the listener is any one of a network driver, interface, component, or module configured to relay messages received from a network protocol stack to a requested network process.

4. The method as recited in claim 1, wherein requesting duplication of the socket further comprises:

passing a function call to a first application service, the function call including parameters of the requested network process; and receiving the first set of data from the first application service.

5. The method as recited in claim 4, wherein the parameters of the function call to the first application service further include one or more state variables associated with the established connection.

6. The method as recited in claim 1, wherein requesting duplication of the socket further comprises evaluating an initial portion of the established connection with dispatch logic, the dispatch logic evaluating one or more of the client identity, the type of data associated with the established connection, the length of the established connection, and the requested network process.

7. The method as recited in claim 1, wherein receiving an indicator that the network process has accepted control comprises sending a signal to a network stack associated with the connection, the signal indicating to a transport layer of the network stack that the listener is no longer able to receive data from the established connection.

8. The method as recited in claim 7, wherein the signal further comprises an instruction to buffer data sent by the client process until the network process has accepted control of the established connection.

9. The method as recited in claim 7, wherein, upon receiving a subsequent set of client process data after sending the signal to the network stack, the method further comprises the listener returning the subsequent set of client process data to the network stack, such that the subsequent set of client process data is buffered until the network process has accepted control of the established connection.

10. The method as recited in claim 1, further comprising passing at least an initial portion of client process data in the established connection to the network process prior to or while requesting duplication of the socket.

11. The method as recited in claim 10, wherein the listener passes one or more of the initial portion of client process data, and the first set of data to the network process through one or more of a shared memory, named pipe, RPC, or DCOM protocol.

12. At a network process in a network computer, wherein a connection is established between a client process at a client computer and the network process through a user-mode listener at the network computer, a method of the network process accepting control of the connection from the listener in user-mode, comprising the acts of:

receiving an initial set of data from a client process through the user-mode listener;

receiving connection information from the user-mode listener, wherein the connection information identifies information about the client process and the established connection;

the network process identifying whether the client process is a trusted client;

determining whether the type of data to be communicated between the client process and the network process is appropriate to be passed directly;

passing a function call to a service, the function call comprising parameters of the initial set of data and a request to duplicate a socket;

receiving data from the service which allows the network process to control a duplicate socket;

accepting control of the duplicate socket from the listener, wherein the network process communicates directly with the client process through the connection in user-mode, and wherein the network process and the client process communicate directly through a network stack without the use of any of the set of a shared memory, a named pipe, an RPC, and DCOM protocol.

13. The method as recited in claim 12, wherein the initial set of data from the client process is received through one or more of a shared memory, a named pipe, an RPC, or DCOM protocol.

14. The method as recited in claim 12, wherein requesting duplication of the socket further comprises:

passing a function call to an application service, the function call including parameters of a first set of data relayed by the user-mode listener; and receiving information from the application service for controlling the socket.

15. The method as recited in claim 14, wherein the first set of data was received by the listener from a first application service, and wherein the first application service is different from the application service to which the network process passes the function call.

16. The method as recited in claim 14, wherein the parameters of the first set of data further comprise one or more state variables associated with the established connection, a request to duplicate the socket, and an initial set of data sent by the client in the established connection.

17. The method as recited in claim 12, wherein, upon receiving the connection information, the network process implements dispatch logic that evaluates whether to accept control of the socket based on one or more of the identity the client process, the type of information sent by the client process in the initial set of data, or the length of the connection.

18. The method as recited in claim 12, wherein accepting control of the socket includes sending an indicator to the listener that the network process has taken control of the socket.

19. The method as recited in claim 12, wherein communicating with the client process directly comprises receiving a subsequent set of client process data directly from the transport layer of the corresponding network protocol stack for the established connection, such that the user-mode listener is avoided.

20. A computer program product for us in a computerized system in which a user-mode listener is configured to relay a connection between a process at a client computer system and a process at the network computer in user-mode, the computer program product comprising computer-readable storage media having computer-executable instructions stored thereon that, when executed, cause the computerized system to perform a method of dispatching control of the connection to the network process in user-mode, comprising the method of claim 1.

* * * * *